G. J. MARTEL.
TIRE PATCHING DEVICE.
APPLICATION FILED JUNE 5, 1911.

1,057,439.

Patented Apr. 1, 1913.

Witnesses:
C. E. Wessels.
A. A. Olson

Inventor:
Gustave J. Martel,
By Joshua R. H. Potts
his Attorney.

UNITED STATES PATENT OFFICE.

GUSTAVE J. MARTEL, OF CHICAGO, ILLINOIS.

TIRE-PATCHING DEVICE.

1,057,439.   Specification of Letters Patent.   Patented Apr. 1, 1913.

Application filed June 5, 1911. Serial No. 631,274.

*To all whom it may concern:*

Be it known that I, GUSTAVE J. MARTEL, a citizen of the United States, and a resident of the city of Chicago, county of Cook, and State of Illinois, have invented certain new and useful Improvements in Tire-Patching Devices, of which the following is a specification.

My invention relates to improvements in patching devices for pneumatic tires, the present device being designed for use especially in conjunction with tires of the "Dunlop" type.

The object of my invention is the production of a patching device of the character mentioned which may be easily and quickly applied and as expeditiously removed when desired, and which will be adapted when in operative position upon a tire to serve to effectually reinforce the latter at the place of application.

Other objects will appear hereinafter.

With these objects in view my invention consists in further details of construction and combinations and arrangements of parts which will be more fully set forth in the following and particularly pointed out in the appended claims.

Figure 1:
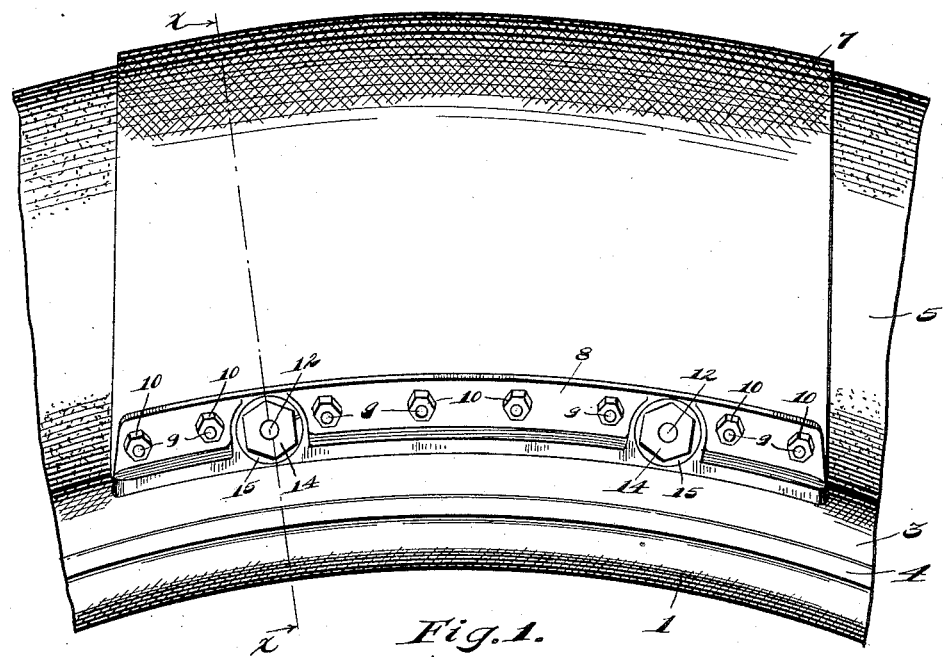
Figure 3:
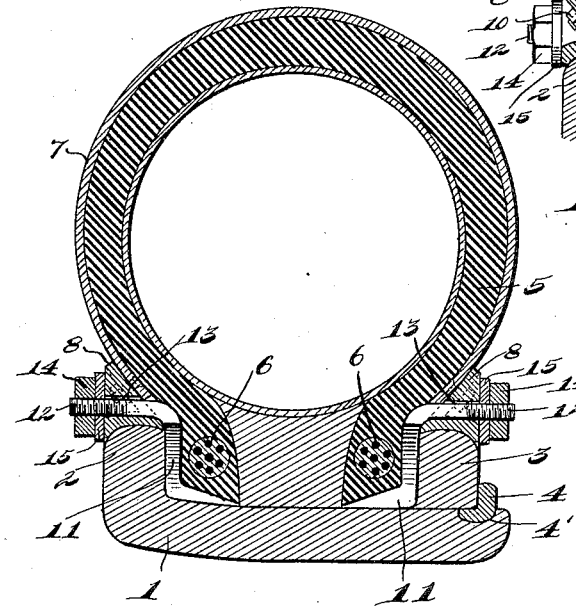
Figure 2:
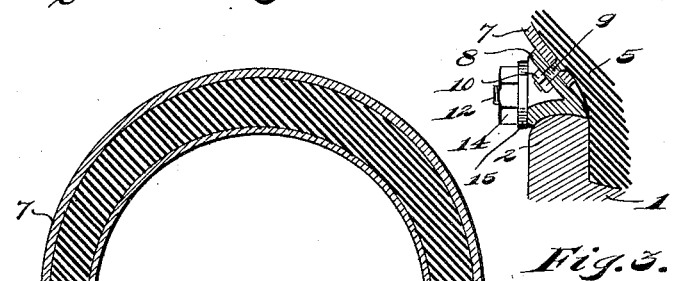

My invention will be best understood by reference to the accompanying drawing which forms a part of this specification, and in which, Figure 1 is a side elevation of a fragment of a pneumatic tire and rim of the "Dunlop" type to which is applied a patching device embodying my invention, Fig. 2 is a transverse section taken on line $x$—$x$ of Fig. 1, and Fig. 3 is a fragmentary sectional detail of the construction.

Referring now to the drawings, 1 designates a pneumatic tire rim of the "Dunlop" type, said rim being provided with the stationary outwardly projecting bead or flange 2 which is disposed at substantially right angles to the body of said rim, and the demountable flange or bead 3 which is disposed similar to the portion 2, the member 3 being removably held in position by the spring ring 4 which is mounted in the groove 4' to coöperate with the member 3 in the usual manner. The construction, as is well known, is such that removal of the tire from the rim is effected by removing the flange 3, this being effected in the first instance upon detachment or removal of the ring 4.

Mounted in the rim 1 is the pneumatic tire which is formed to correspond with the construction of said rim, the casing 5 of said tire being provided at its edges with nonexpansible cords or cables 6 which are embedded therein as shown, said cables serving to maintain the edges of the tire casing in proper position in the channel of the rim preventing expansion thereof as is well known; removal of the tire being effected by lateral sliding thereof after removal of the flange 3.

The patching device which constitutes the subject matter of this invention is comprised of the strap 7 which is formed of any suitable, durable, flexible material such as leather or raw hide. The strap 7 may be of any desired width, the same being of such a length as to be adapted to extend about the tread portion of the tire from one flange or edge of the rim to the other. Arranged at the respective extremities of the strap 7 are yokes or bars 8 which are secured thereto by means of screws 9 and nuts 10. The bars 8 are of a length substantially equal with the width of the strap 7, the same being of bowed or curved formation longitudinally to correspond with the curvature of the rim, the inner or contacting edges thereof being formed and so disposed as to be adapted to fit snugly the outer edges of the flanges 2 and 3 and to correspond with the curvature or disposition of the adjacent portions of the tire and so that when said bars are in operative position upon the outer edges of the flanges 2 and 3, the respective extremities of the strap 7 will be held in close engagement wth the adjacent sides of the tire, as clearly shown in Fig. 2.

The bars 8 and hence the strap 7 are held in operative position through the medium of securing devices the inner ends 11 of which are angularly formed to correspond with the formation of the rim and so as to adapt the extreme inner ends of said members to rest under the edges of the tire casing 5 as shown in Fig. 2. In order to facilitate insertion of the inner ends of said securing members under the edges of the casing 5, said ends of said members are tapered to substantially a knife edge. When said securing members are so arranged, it will be observed, that the same will be locked in position against outward movement by the edges of the tire casing engaging therewith and indirectly by the reinforcing of expansible cables or cords 6 arranged in said edges of said casing; said securing members being held against lateral movement by the engaging flanges 2 and 3 of the rim as will be readily understood. Said securing devices are formed with outwardly projecting screw threaded shanks 12 which are adapted to loosely engage perforations 13 provided for the reception thereof in the bars 8, the latter being releasably secured to said shanks by means of nuts 14 threaded upon said shanks, nut-locks 15 of any approved design being arranged for coöperation with said nuts to prevent accidental displacement thereof. Thus it will be seen the securing devices serve to secure the bars 5 in operative position wedged between the adjacent angularly disposed edges of the tire and rim flanges and consequently to maintain the strap 7 in operative position about the tire.

With the construction set forth it is evident that attachment thereof to a tire and rim may be readily effected when the tire is in deflated condition, inflation of the tire serving to stretch the strap about the tire into close engagement therewith so that said strap will serve to strengthen and reinforce the tire. In the event of the strap stretching it is evident that one of the bars 8 may be detached and the strap shortened to the proper length, the bar being adapted to be readily and quickly replaced after the strap has been made the proper length desired.

A tire patching device of the construction set forth is durable and economical and the same is of high efficiency in operation.

While I have described and illustrated the preferred form of construction for carrying my invention into effect, this may be varied or modified without stepping outside the scope of this invention. I, therefore, do not wish to be limited to the precise details of construction as described, but wish to avail myself of variations and modifications coming within the scope of the claims hereunto appended.

Having described my invention what I claim as new and desire to secure by Letters Patent is:

1. In a tire patching device, the combination of a flexible patching strap adapted to extend over the tread portion of said tire; and means engaging the extremities of said strap for securing the latter to the tire, said means comprising bars secured to the respective extremities of said strap; securing members adapted for engagement under said tire, and having outwardly projecting screw threaded shanks loosely engaging perforations in said bars; and nuts threaded upon the outer ends of said shanks for locking said bars, to said shanks, substantially as described.

2. In a tire patching device, the combination of a flexible patching strap adapted to extend over the tread portion of said tire; and means engaging the extremities of said strap for securing the latter to said rim, said means comprising bars secured to the respective extremities of said strap; securing members having angularly formed tapering inner ends adapted for engagement under the edges of said tire and having outwardly projecting shanks loosely engaging perforations in said bars; and means on the outer ends of said shanks for locking said bars to said shanks, substantially as described.

In testimony whereof I have signed my name to this specification in the presence of two subscribing witnesses.

GUSTAVE J. MARTEL.

Witnesses:
CATHERN MAGUIRE,
M. JOHNSON.

---

Copies of this patent may be obtained for five cents each, by addressing the "Commissioner of Patents, Washington, D. C."